(12) United States Patent
Park et al.

(10) Patent No.: US 11,576,098 B2
(45) Date of Patent: Feb. 7, 2023

(54) METHOD FOR SHORTENING CALL CONNECTION TIME AND ELECTRONIC DEVICE THEREFOR

(71) Applicant: SAMSUNG ELECTRONICS CO., LTD., Suwon-si (KR)

(72) Inventors: Jeongseop Park, Suwon-si (KR); Sooyoung Nam, Suwon-si (KR); Junhong Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/082,683

(22) Filed: Oct. 28, 2020

(65) Prior Publication Data

US 2021/0136644 A1    May 6, 2021

(30) Foreign Application Priority Data

Nov. 5, 2019    (KR) .......................... 10-2019-0139928

(51) Int. Cl.
*H04W 36/14*    (2009.01)
*H04W 36/00*    (2009.01)

(52) U.S. Cl.
CPC ....... *H04W 36/14* (2013.01); *H04W 36/0022* (2013.01)

(58) Field of Classification Search
CPC . H04W 36/14; H04W 36/0022; H04W 88/06; H04W 76/15; H04W 36/18; H04W 76/10
(Continued)

(56) References Cited

U.S. PATENT DOCUMENTS

2016/0029197 A1    1/2016 Gellens
2016/0081081 A1*   3/2016 Xu .................... H04W 72/0426
                                                    370/329
(Continued)

FOREIGN PATENT DOCUMENTS

KR    10-2010-0060353    6/2010
WO    2016/014844        1/2016
WO    2020/030972        2/2020

OTHER PUBLICATIONS

International Search Report dated Jan. 29, 2021 in corresponding International Application No. PCT/KR2020/014743.
(Continued)

*Primary Examiner* — Michael Y Mapa
(74) *Attorney, Agent, or Firm* — Nixon & Vanderhye P.C.

(57) ABSTRACT

An electronic device connected to a first communication network is provided. The electronic device may include: a communication module comprising communication circuitry; a processor operatively connected to the communication module; and a memory operatively connected to the processor, wherein the memory may store instructions that, when executed, cause the processor to control the electronic device to: transmit a message requesting a call connection through a first transmission protocol to an external electronic device using the communication module; receive a provisional response message for the request through the first transmission protocol from the external electronic device using the communication module; connect to a second communication network using the communication module based on the call connection not being supported by the first communication network; transmit a response message for the received provisional response message through a second transmission protocol to the external electronic device using
(Continued)

the communication module; and perform the call connection using the connected second communication network.

10 Claims, 8 Drawing Sheets

(58) Field of Classification Search
USPC .................................. 455/436–445; 370/331
See application file for complete search history.

(56) References Cited

U.S. PATENT DOCUMENTS

| | | | |
|---|---|---|---|
| 2017/0163607 A1* | 6/2017 | Skuratovich | H04L 65/1046 |
| 2018/0139661 A1* | 5/2018 | Kumar | H04W 8/22 |
| 2019/0191349 A1 | 6/2019 | Kim et al. | |
| 2019/0320351 A1* | 10/2019 | Sahin | H04L 65/1016 |
| 2019/0373525 A1* | 12/2019 | Singh | H04W 36/14 |
| 2020/0053133 A1 | 2/2020 | Atarius et al. | |
| 2020/0112887 A1* | 4/2020 | Kwok | H04L 65/1016 |

OTHER PUBLICATIONS

European Search Report and Written Opinion dated Mar. 30, 2021 in corresponding European Application No. 20205513.3.
Motorola Mobility et al., "Suppod of EPS Fallback for voice without impacting IMS", S2-185409, TSG SA WG2 Meeting #127b, Newport Beach, California, May 28, 2018, pp. 1-8.
Intel, "Discussion on EPS fallback for voice", S2-180231, TSG SA WG2 #125, Gothenburg, Sweden, Jan. 16, 2018, pp. 1-12.
Ericsson, 'EPS fallback for voice—analysis', S2-180425, TSG SA WG2 #125, Gothenburg, Sweden, Jan. 16, 2018, pp. 1-9.
European Office Action dated Oct. 31, 2022 for EP Application No. 20205513.3.

* cited by examiner

METHOD FOR SHORTENING CALL CONNECTION TIME AND ELECTRONIC DEVICE THEREFOR

CROSS-REFERENCE TO RELATED APPLICATION

This application is based on and claims priority under 35 U.S.C. § 119 to Korean Patent Application No. 10-2019-0139928, filed on Nov. 5, 2019, in the Korean Intellectual Property Office, the disclosure of which is incorporated by reference herein in its entirety.

BACKGROUND

Field

The disclosure relates to a method for shortening the call connection time and an electronic device therefor.

Description of Related Art

As communication technology advances, two or more communication networks can be used together. For example, previously, third generation (3G) communication and long term evolution (LTE) communication have been used at the same time, and now LTE communication and fifth generation (5G) communication can be used together. 5G communication, which is under development, cannot support all services supported by LTE communication. Consequently, when an electronic device connected to 5G communication intends to use a service that is not supported by 5G communication, the electronic device may need to switch the communication network to LTE communication.

If a service cannot be provided to the user through a communication network to which an electronic device is connected, the electronic device may connect to a second communication network. While being connected to the second communication network, the electronic device may be unable to transmit a message to a second electronic device. The electronic device may also be unable to receive a message transmitted by the second electronic device. In some cases, the second electronic device cannot confirm whether the electronic device has received the transmitted message.

After the electronic device is connected to the second communication network, it may be necessary to newly transmit and receive some messages according to the transmission protocol, and thus there may be a time delay in providing a service to the user.

SUMMARY

Embodiments of the disclosure provide a method for shortening the call connection time and an electronic device therefor.

Embodiments of the disclosure provide an electronic device and method that can shorten the call connection time when it is necessary to switch the communication network because the currently connected communication network does not support a call connection.

Embodiments of the disclosure provide an electronic device that can shorten the call connection time even when the counterpart electronic device switches the communication network.

According to various example embodiments of the disclosure, an electronic device connected to a first communication network is provided. The electronic device may include: a communication module comprising communication circuitry; a processor operatively connected to the communication module; and a memory operatively connected to the processor, wherein the memory may store instructions that, when executed, cause the processor to control the electronic device to: transmit a message requesting a call connection through a first transmission protocol to an external electronic device using the communication module; receive a provisional response message for the request through the first transmission protocol from the external electronic device using the communication module; connect to a second communication network using the communication module based on the call connection not being supported by the first communication network; transmit a response message for the received provisional response message through a second transmission protocol to the external electronic device using the communication module; and perform the call connection using the connected second communication network.

According to various example embodiments of the disclosure, an electronic device connected to a first communication network is provided. The electronic device may include: a communication module comprising communication circuitry; a processor operatively connected to the communication module; and a memory operatively connected to the processor, wherein the memory may store instructions that, when executed, cause the processor to control the electronic device to: receive a message requesting a call connection through a first transmission protocol from an external electronic device using the communication module; transmit a provisional response message for the request through the first transmission protocol to the external electronic device using the communication module; connect to a second communication network using the communication module based on the call connection not being supported by the first communication network; retransmit the provisional response message through a second transmission protocol to the external electronic device using the communication module; and perform the call connection using the connected second communication network.

According to various example embodiments of the disclosure, an operation method of an electronic device connected to a first communication network is provided. The operation method may include: transmitting a message requesting a call connection to an external electronic device using a first transmission protocol; receiving a provisional response message for the request from the external electronic device using the first transmission protocol; connecting to a second communication network based on the call connection not being supported by the first communication network; transmitting a message for the received provisional response message to the external electronic device using a second transmission protocol; and performing the call connection using the connected second communication network.

According to various example embodiments of the disclosure, an operation method of an electronic device connected to a first communication network is provided. The operation method may include: receiving a message requesting a call connection from an external electronic device using a first transmission protocol; transmitting a provisional response message for the request to the external electronic device using the first transmission protocol; connecting to a second communication network based on the call connection not being supported by the first communication network; retransmitting the provisional response message to the external electronic device using a second transmission protocol; and performing the call connection using the connected second communication network.

According to various example embodiments of the disclosure, when it is necessary to switch the communication network because the currently connected communication network does not support a call connection, the electronic device can shorten the call connection time.

According to various example embodiments of the disclosure, the electronic device can shorten the call connection time even when the counterpart electronic device switches the communication network.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Hereinafter, various example embodiments of the disclosure will be described in greater detail with reference to accompanying drawings.

Figure 1:
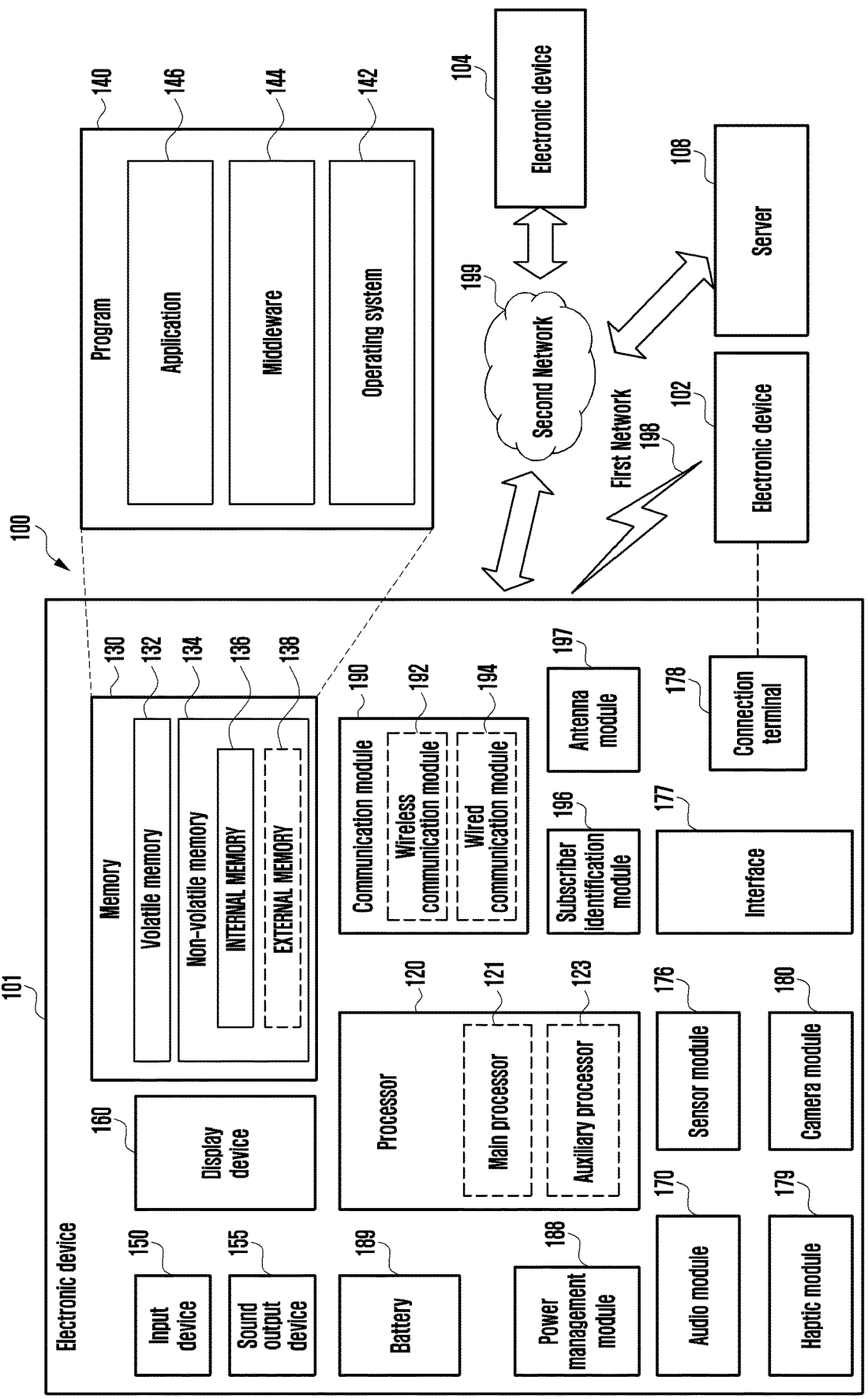
FIG. 1 is a block diagram illustrating an example electronic device according to various embodiments.

FIG. 1 is a block diagram illustrating an example electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

Figure 2:
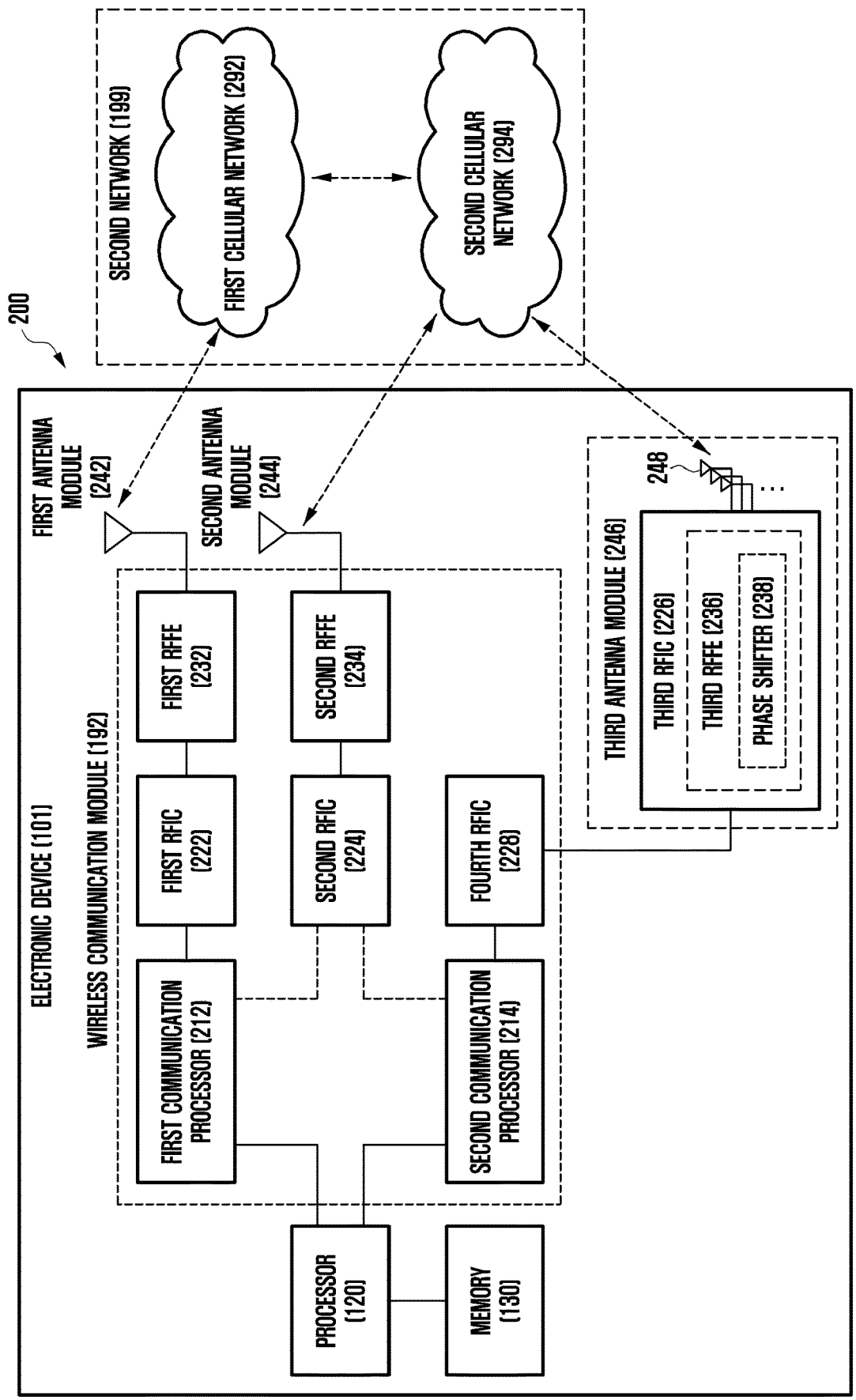
FIG. 2 is a block diagram illustrating an example electronic device for supporting legacy network communication and 5G network communication according to various embodiments.

FIG. 2 is a block diagram 200 illustrating an example electronic device 101 for supporting legacy network communication and 5G network communication according to various embodiments. Referring to FIG. 2, the electronic device 101 may include a first communication processor 212, a second communication processor 214, a first radio frequency integrated circuit (RFIC) 222, a second RFIC 224, a third RFIC 226, a fourth RFIC 228, a first radio frequency front end (RFFE) 232, a second RFFE 234, a first antenna module 242, a second antenna module 244, and an antenna 248. The electronic device 101 may further include the processor 120 and the memory 130. The network 199 may include a first network 292 and a second network 294. According to another embodiment, the electronic device 101 may further include at least one component among the components illustrated in FIG. 1, and the network 199 may further include at least one other network. According to an embodiment, the first communication processor 212, the second communication processor 214, the first RFIC 222, the second RFIC 224, the fourth RFIC 228, the first RFFE 232, and the second RFFE 234 may be included as at least a part of the wireless communication module 192. According to another embodiment, the fourth RFIC 228 may be omitted or may be included as a part of the third RFIC 226.

The first communication processor 212 may establish a communication channel of a band to be used for wireless communication with the first network 292, and may support legacy network communication via the established communication channel. According to certain embodiments, the first network may be a legacy network including 2G, 3G, 4G, or long term evolution (LTE) network. The second communication processor 214 may establish a communication channel corresponding to a designated band (e.g., approximately 6 GHz to 60 GHz) among bands to be used for wireless communication with the second network 294, and may support 5G network communication via the established channel. According to certain embodiments, the second network 294 may be a 5G network defined in 3GPP. Additionally, according to an embodiment, the first communication processor 212 or the second communication processor 214 may establish a communication channel corresponding to another designated band (e.g., lower than 6 GHz) among bands to be used for wireless communication with the second network 294, and may support 5G network communication via the established channel. According to an embodiment, the first communication processor 212 and the second communication processor 214 may be implemented in a single chip or a single package. According to certain embodiments, the first communication processor 212 or the second communication processor 214 may be implemented in a single chip or a single package, together with the processor 120, the sub-processor 123, or the communication module 190.

In the case of transmission, the first RFIC 222 may convert a baseband signal generated by the first communication processor 212 into a radio frequency (RF) signal in a range of approximately 700 MHz to 3 GHz used for the first network 292 (e.g., a legacy network). In the case of reception, an RF signal is obtained from the first network 292 (e.g., a legacy network) via an antenna (e.g., the first antenna module 242), and may be preprocessed via an RFFE (e.g., the first RFFE 232). The first RFIC 222 may convert the preprocessed RF signal to a baseband signal so that the base band signal is processed by the first communication processor 212.

In the case of transmission, the second RFIC 224 may convert a baseband signal generated by the first communication processor 212 or the second communication processor 214 into an RF signal (hereinafter, a 5G Sub6 RF signal) of a Sub6 band (e.g., lower than 6 GHz) used for the second network 294 (e.g., 5G network). In the case of reception, a 5G Sub6 RF signal is obtained from the second network 294 (e.g., a 5G network) via an antenna (e.g., the second antenna module 244), and may preprocessed by an RFFE (e.g., the second RFFE 234). The second RFIC 224 may convert the preprocessed 5G Sub6 RF signal into a baseband signal so that the baseband signal is processed by a corresponding communication processor from among the first communication processor 212 or the second communication processor 214.

The third RFIC 226 may convert a baseband signal generated by the second communication processor 214 into an RF signal (hereinafter, a 5G Above6 RF signal) of a 5G Above6 band (e.g., approximately 6 GHz to 60 GHz) to be used for the second network 294 (e.g., 5G network). In the case of reception, a 5G Above6 RF signal is obtained from the second network 294 (e.g., a 5G network) via an antenna (e.g., the antenna 248), and may be preprocessed by the third RFFE 236. The third RFIC 226 may convert the preprocessed 5G Above6 RF signal to a baseband signal so that the base band signal is processed by the second communication processor 214. According to an embodiment, the third RFFE 236 may be implemented as a part of the third RFIC 226.

According to an embodiment, the electronic device 101 may include the fourth RFIC 228, separately from or as a part of the third RFIC 226. In this instance, the fourth RFIC 228 may convert a baseband signal generated by the second communication processor 214 into an RF signal (hereinafter, an IF signal) in an intermediate frequency band (e.g., approximately 9 GHz to 11 GHz), and may transfer the IF signal to the third RFIC 226. The third RFIC 226 may convert the IF signal to a 5G Above6 RF signal. In the case of reception, a 5G Above6 RF signal is received from the second network 294 (e.g., a 5G network) via an antenna (e.g., the antenna 248), and may be converted into an IF signal by the third RFFE 226. The fourth RFIC 228 may convert the IF signal to a baseband signal so that the base band signal is processed by the second communication processor 214.

According to an embodiment, the first RFIC 222 and the second RFIC 224 may be implemented as a single chip or at least a part of the single package. According to an embodiment, the first RFFE 232 and the second RFFE 234 may be implemented as a single chip or at least a part of the single package. According to an embodiment, at least one antenna module of the first antenna module 242 or the second antenna module 244 may be omitted, or may be combined with another antenna module so as to process RF signals in a plurality of bands.

According to an embodiment, the third RFIC 226 and the antenna 248 may be disposed in the same substrate, and may form the third antenna module 246. For example, the wireless communication module 192 or the processor 120 may be disposed in a first substrate (e.g., main PCB). In this instance, the third RFIC 226 is disposed in a part (e.g., a lower part) of the second substrate (e.g., a sub PCB) separate from the first substrate and the antenna 248 is disposed on another part (e.g., an upper part), so that the third antenna module 246 is formed. By disposing the third RFIC 226 and the antenna 248 in the same substrate, the length of a transmission line therebetween may be reduced. For example, this may reduce a loss (e.g., attenuation) of a signal in a high-frequency band (e.g., approximate 6 GHz to 60 GHz) used for 5G network communication, the loss being caused by a transmission line. Accordingly, the electronic device 101 may improve the quality or speed of communication with the second network 294 (e.g., 5G network).

According to an embodiment, the antenna 248 may be implemented as an antenna array including a plurality of antenna elements which may be used for beamforming. In this instance, the third RFIC 226 may be, for example, a part of the third RFFE 236, and may include a plurality of phase shifters 238 corresponding to a plurality of antenna elements. In the case of transmission, each of the plurality of phase shifters 238 may shift the phase of a 5G Above6 RF signal to be transmitted to the outside of the electronic device 101 (e.g., a base station of a 5G network) via a corresponding antenna element. In the case of reception, each of the plurality of phase shifters 238 may shift the phase of the 5G Above6 RF signal received from the outside via a corresponding antenna element into the same or substantially the same phase. This may enable transmission or reception via beamforming between the electronic device 101 and the outside.

The second network 294 (e.g., 5G network) may operate independently (e.g., Stand-Along (SA)) from the first network 292 (e.g., a legacy network), or may operate by being connected thereto (e.g., Non-Stand Alone (NSA)). For example, in the 5G network, only an access network (e.g., 5G radio access network (RAN) or next generation RAN (NG RAN)) may exist, and a core network (e.g., next generation core (NGC)) may not exist. In this instance, the electronic device 101 may access an access network of the 5G network, and may access an external network (e.g., the Internet) under the control of the core network (e.g., an evolved packed core (EPC)) of the legacy network. Protocol information (e.g., LTE protocol information) for communication with the legacy network or protocol information (e.g., New Radio (NR) protocol information) for communication with the 5G network may be stored in the memory 230, and may be accessed by another component (e.g., the processor 120, the first communication processor 212, or the second communication processor 214).

Figure 3:
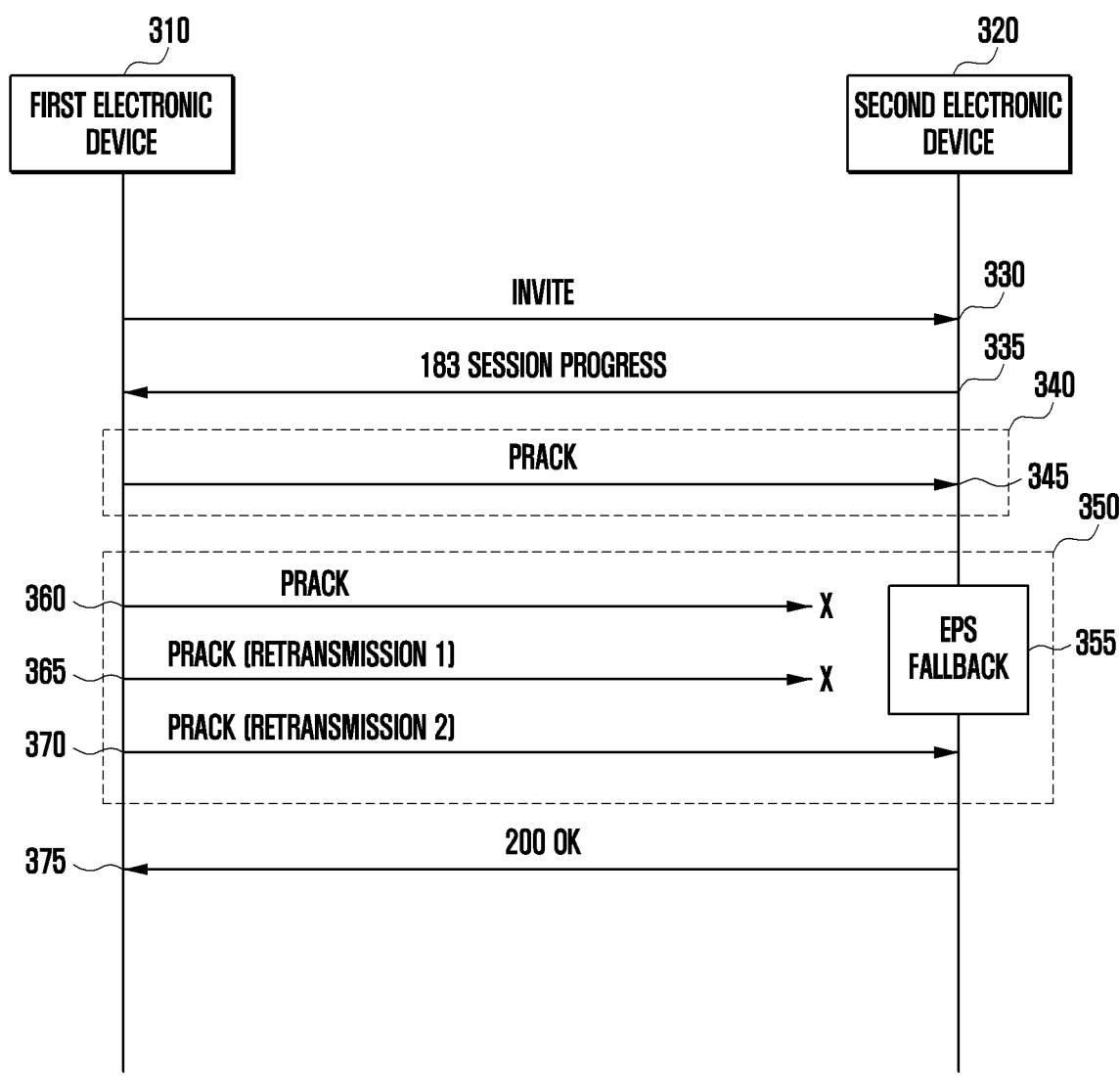
FIG. 3 is a signal flow diagram illustrating an example of call processing between electronic devices according to various embodiments.

FIG. 3 is a signal flow diagram illustrating an example of call processing between electronic devices according to various embodiments.

For example, the first electronic device 310 (e.g., electronic device 101 in FIG. 1) may attempt to connect a call to the second electronic device 320 (e.g., electronic device 101 in FIG. 1).

For control processing of a call or a session, an electronic device may transmit a session initiation protocol (SIP) message. SIP messages may include a request message and a response message, and may be transmitted using, for example, the user datagram protocol (UDP) or the transmission control protocol (TCP). For example, when the maximum segment unit (MSS) denotes the size of pure data excluding the header in one packet, if a SIP message has a size greater than the MSS, the transmission control protocol may be used to transmit the SIP message; and if the SIP message has a size less than the MSS, the user datagram protocol can be used to transmit the SIP message.

The transmission control protocol may include, for example, a protocol that provides reliable data transmission, flow control, and congestion control between the transmitting electronic device and the receiving electronic device. The user datagram protocol may include, for example, a protocol that allows the transmitting electronic device to unilaterally transmit data and is configured so that the transmitting electronic device cannot and does not need to check whether the receiving electronic device has received the data.

At operation 330, the first electronic device 310 may transmit an Invite as a SIP request message for call connection.

At operation 335, as a provisional response in reply to the Invite, the second electronic device 320 may transmit a 183 Session Progress as a SIP response message. The 183 Session Progress may include information being processed.

The second electronic device 320 may perform a call connection using the currently connected communication network, but if the currently connected communication network cannot support a call connection, the second electronic device 320 may perform a call connection using another communication network.

Hereinafter, examples in which the communication network currently connected to the second electronic device 320 supports a call connection and does not support a call connection may be described separately.

When the communication network to which the second electronic device 320 is currently connected supports a call connection (340), at operation 345, the first electronic device 310 may transmit a provisional response acknowledgment (PRACK) as a SIP request message in reply to the 183 Session Progress. The first electronic device 310 may provide a reliable provisional response for a session that has not yet been established by transmitting a PRACK. As the second electronic device 320 performs a call connection using the currently connected communication network, the second electronic device 320 may receive the PRACK transmitted by the first electronic device 310.

The second electronic device 320 may connect to another communication network when the currently connected communication network cannot support a call connection (350).

At operation 355, the second electronic device 320 may perform, for example, evolved packet system (EPS) fallback. While evolved packet system (EPS) fallback is in progress, the second electronic device 320 may be unable to receive a message transmitted by another electronic device (e.g., first electronic device 310), so messages transmitted by other electronic devices may be lost. Also, while evolved packet system (EPS) fallback is in progress, the second electronic device 320 may be unable to transmit a message to the other electronic device 310.

At operation 360, the first electronic device 310 may transmit a PRACK as a SIP request message. As the size of the PRACK may be less than the MSS, and the first electronic device 310 may transmit the PRACK thorough the user datagram protocol (UDP). If no response is received from the second electronic device 320 after transmitting the PRACK, the first electronic device 310 may retransmit the PRACK according to the message transmission protocol standard. For example, the retransmission time interval may be determined according to a timer value, and the timer value of the user datagram protocol may be 2 seconds.

At operation 365, the first electronic device 310 may retransmit the PRACK according to the message transmission protocol standard. However, if evolved packet system fallback is in progress, the second electronic device 320 may be unable to receive the PRACK and may be unable to transmit any response. Similarly, if no response is still received from the second electronic device 320 after transmitting the PRACK, the first electronic device 310 may retransmit the PRACK according to the message transmission protocol standard. For example, the second retransmission time interval may also be determined according to the timer value, and the second retransmission time interval for the user datagram protocol may be 4 seconds as twice the timer value.

At operation 370, the first electronic device 310 may retransmit the PRACK according to the message transmission protocol standard until a response is received from the second electronic device 320. After completion of evolved packet system fallback, the second electronic device 320 may receive the PRACK. However, if the user no longer wants to connect a call, the first electronic device 310 may not transmit the PRACK.

At operation 375, upon receiving the PRACK, the second electronic device 320 may transmit a 200 OK as a SIP response message regardless of the connected communication network.

Although the second electronic device 320 is able to receive a PRACK after evolved packet system (EPS) fallback is completed, as the first electronic device 310 does not transmit a PRACK, the second electronic device 320 may not receive the PRACK. As the second electronic device 320 needs to receive a PRACK transmitted by the first electronic device 310 to perform the next operation, the delay time for a call connection may be increased correspondingly. The delay time of a call connection may vary depending on whether a specific interface is supported in the connected communication network and the execution time of evolved packet system fallback. For example, when the connected communication network supports the N26 interface between the mobility management entity (MME) of the evolved packet system and the access and mobility management function (AMF) of the 5G system, as the execution time of evolved packet system fallback is shortened, the delay time of a call connection can also be shortened. The N26 interface may be selectively supported by the network operator.

Although FIG. 3 illustrates an example in which evolved packet system fallback occurs in the electronic device receiving a call connection request, evolved packet system fallback may also be performed in the electronic device requesting a call connection.

According to various embodiments of the disclosure, a method that can shorten the delay of a call connection even when evolved packet system fallback is performed is described for each electronic device performing evolved packet system fallback.

Although a call connection will be described as an example in the following description, various embodiments of the disclosure may be applicable to any service provided by an electronic device using a communication network.

Figure 4:
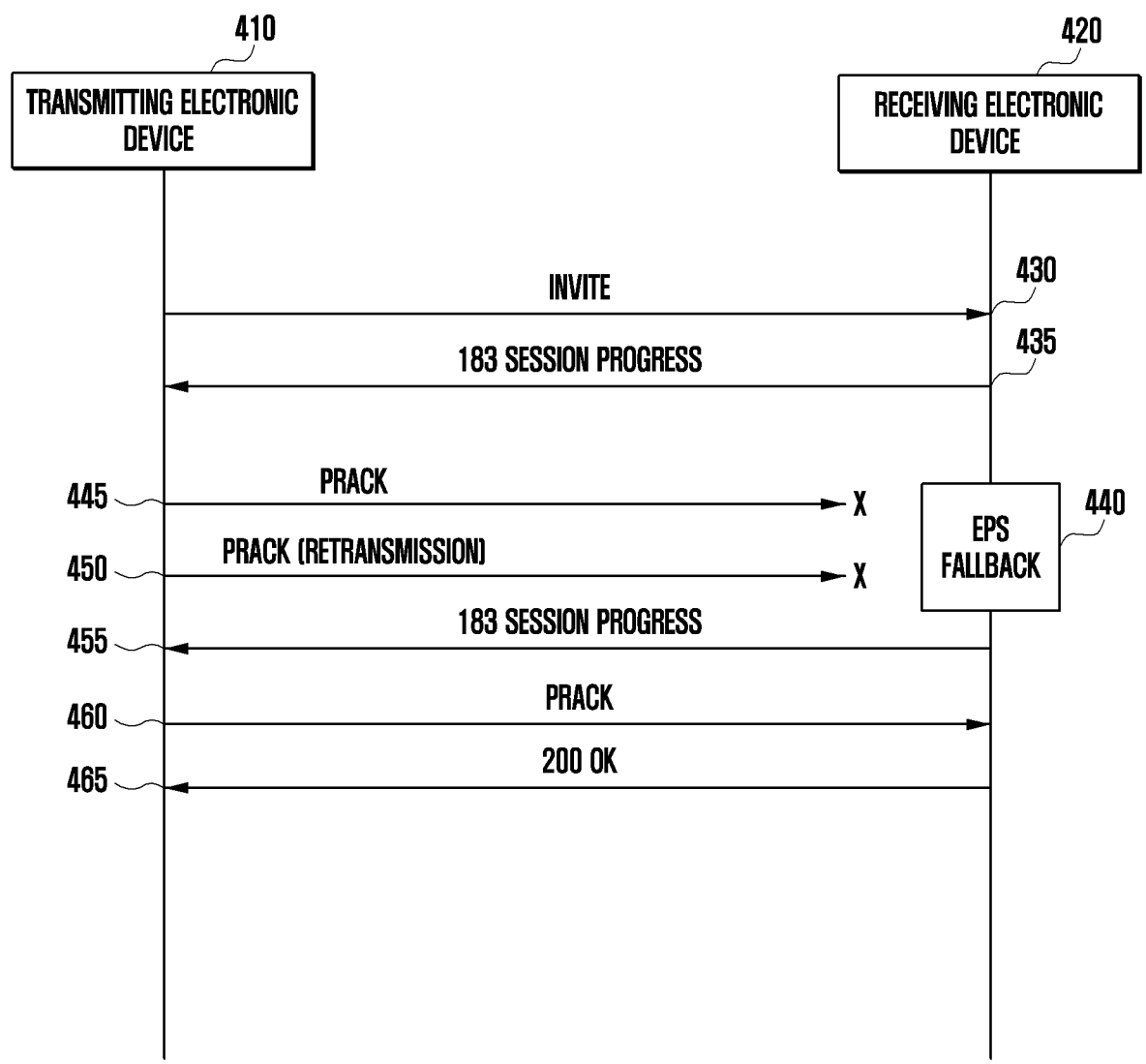
FIG. 4 is a signal flow diagram illustrating an example of call processing when evolved packet system (EPS) fallback is performed in the receiving electronic device according to various embodiments.

FIG. 4 is a signal flow diagram illustrating an example of call processing when evolved packet system (EPS) fallback is performed in the receiving electronic device according to various embodiments.

According to various embodiments of the disclosure, as the communication network to which the receiving electronic device 420 (e.g., second electronic device 320 in FIG. 3) is currently connected does not support the call connection requested by the transmitting electronic device 410 (e.g., first electronic device 310 in FIG. 3), the receiving electronic device 420 may perform evolved packet system (EPS) fallback.

At operation 430, the transmitting electronic device 410 may transmit an Invite as a SIP request message for call connection.

At operation 435, as a provisional response in reply to the Invite, the second electronic device 320 may transmit a 183 Session Progress as a SIP response message.

At operation 440, when the currently connected communication network cannot support the call connection, the receiving electronic device 420 may perform evolved packet system (EPS) fallback for connecting to a different communication network.

At operation 445, the transmitting electronic device 410 may transmit a PRACK as a SIP request message in reply to the 183 Session Progress.

At operation 450, if no response is received for the PRACK, the transmitting electronic device 410 may retransmit the PRACK.

While performing evolved packet system fallback, the receiving electronic device 420 may fail to receive the PRACK transmitted by the transmitting electronic device 410, and the PRACK not received may be lost.

At operation 455, when evolved packet system fallback is completed, the receiving electronic device 420 may retransmit the 183 Session Progress using a SIP response message without waiting for a PRACK from the transmitting electronic device 410. The SIP response message can be transmitted using the transmission control protocol (TCP) regardless of its size. The SIP response message may further include information indicating completion of evolved packet system fallback. For example, information indicating completion of evolved packet system fallback may be included in the header of the SIP response message. Alternatively, the receiving electronic device 420 may separately notify that EPS fallback is completed.

At operation 460, upon detecting information indicating completion of evolved packet system fallback, the transmitting electronic device 410 may immediately retransmit the PRACK.

At operation 465, the receiving electronic device 420 may transmit a 200 OK using a SIP response message in reply to the PRACK.

Figure 5:
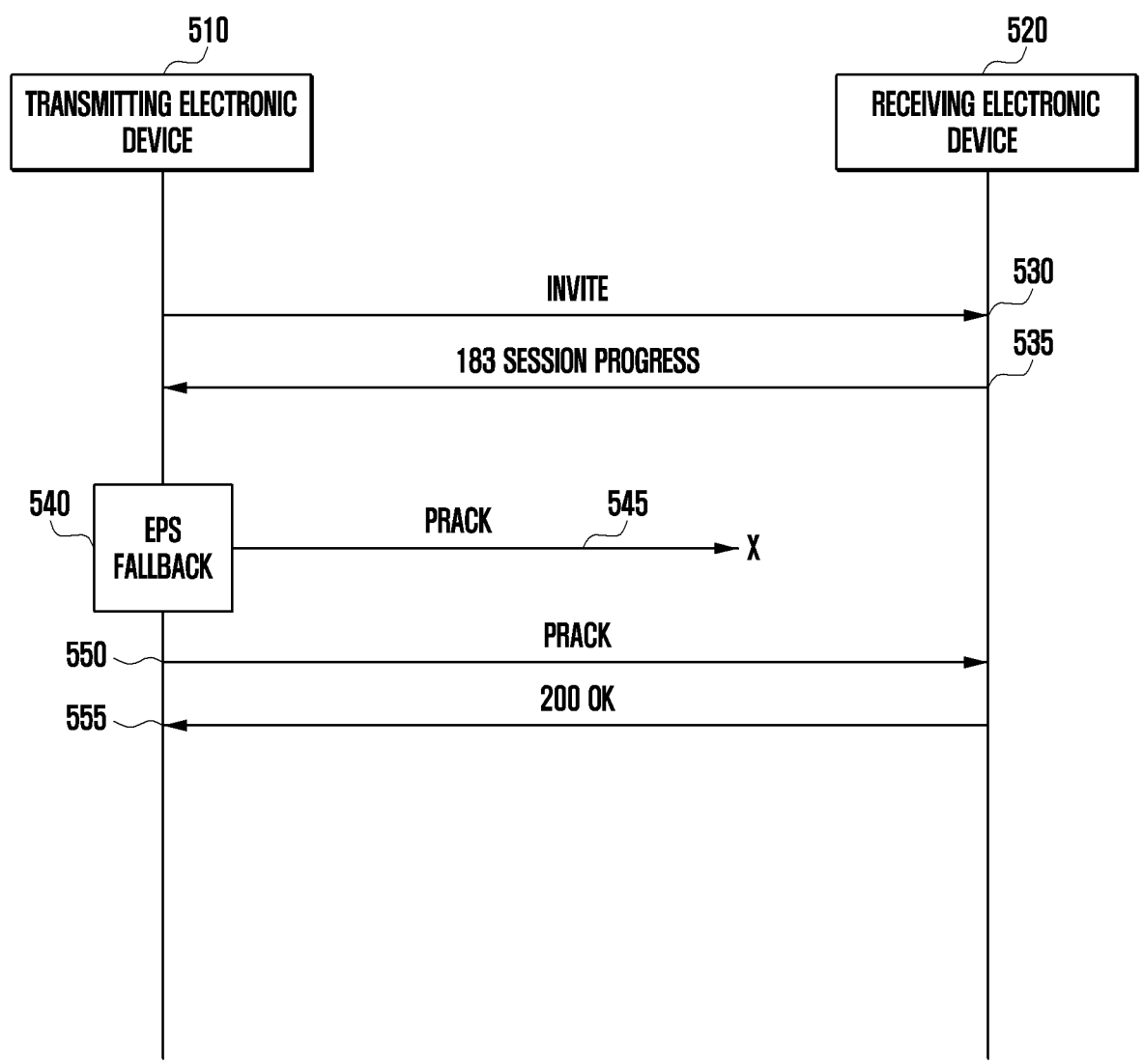
FIG. 5 is a signal flow diagram illustrating an example of call processing when evolved packet system (EPS) fallback is performed in the transmitting electronic device according to various embodiments.

FIG. 5 is a signal flow diagram illustrating an example of call processing when evolved packet system (EPS) fallback is performed in the transmitting electronic device according to various embodiments.

According to various embodiments of the disclosure, the transmitting electronic device 510 (e.g., transmitting electronic device 410 in FIG. 4) attempts to connect a call according to the user's request, but when the currently connected communication network does not support a call connection, it may perform evolved packet system (EPS) fallback.

Operations 530 and 535 are the same as or similar to operations 430 and 435 in FIG. 4, and descriptions thereof may not be repeated here.

At operation 540, when the currently connected communication network cannot support a call connection, the transmitting electronic device 510 may perform evolved packet system fallback for connecting to another communication network. For example, the transmitting electronic device 510 may be connected to a fifth generation (5G) network. The 5G network to which the transmitting electronic device 510 is connected may not support VoNR (voice/video over new radio), or may be unable to support VoNR due to another reason, for example, an increase in call volume. In this case, when the user requests a call connection for a video call, as the currently connected 5G network cannot support the video call, the transmitting electronic device 510 may perform evolved packet system fallback to a long term evolution (LTE) network.

At operation 545, the transmitting electronic device 510 may attempt to transmit a PRACK separately from performing evolved packet system fallback. However, during execution of evolved packet system fallback, the PRACK may be stored only in the memory of the transmitting electronic device 510 without being transmitted to the outside.

At operation 550, when the execution of evolved packet system fallback is completed, the transmitting electronic device 510 may immediately transmit a PRACK using a SIP request message. As the size of a PRACK may be less than the MSS, the user datagram protocol is generally used, but the transmission control protocol (TCP) may be used regardless of the PRACK size according to various embodiments of the disclosure.

At operation 555, the receiving electronic device 520 (e.g., receiving electronic device 420 in FIG. 4) may transmit a 200 OK using a SIP response message in reply to the PRACK.

Figure 6:
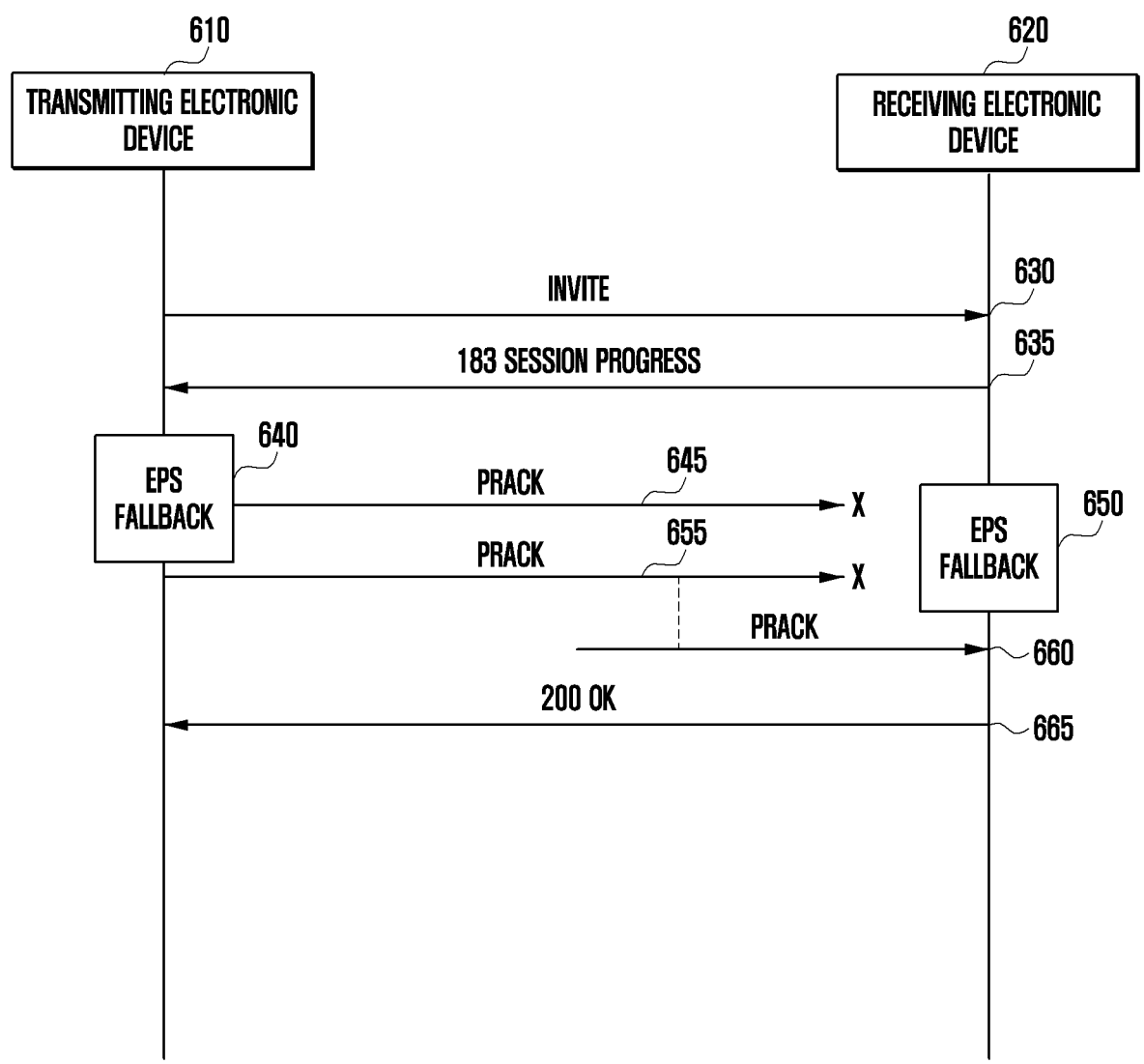
FIG. 6 is a signal flow diagram illustrating an example of call processing when evolved packet system (EPS) fallback is performed in both the transmitting electronic device and the receiving electronic device according to various embodiments.

FIG. 6 is a signal flow diagram illustrating an example of call processing when evolved packet system (EPS) fallback is performed in both the transmitting electronic device and the receiving electronic device according to various embodiments.

According to various embodiments of the disclosure, evolved packet system fallback can be performed not only in the transmitting electronic device 610 (e.g., transmitting electronic device 510 in FIG. 5) but also in the receiving electronic device 620 (e.g., receiving electronic device 520 in FIG. 5).

Operation 630 and operation 635 are the same as or similar to operation 430 and operation 435 in FIG. 4 and operation 530 and operation 535 in FIG. 5, and descriptions thereof may not be repeated here.

At operation 640, when the currently connected communication network cannot support a call connection, the transmitting electronic device 610 may perform evolved packet system fallback for connecting to another communication network. For example, in a situation where the transmitting electronic device 610 is connected to a 5G (generation) network that does not support VoNR, when the user requests a call connection for a video call, the transmitting electronic device 610 may perform evolved packet system fallback.

At operation 645, the transmitting electronic device 610 may attempt to transmit a PRACK separately from performing evolved packet system fallback. However, during execution of evolved packet system fallback, the PRACK may be stored only in the memory of the transmitting electronic device 610 without being transmitted to the outside.

At operation 650, when the currently connected communication network cannot support a call connection, the receiving electronic device 620 may also perform evolved packet system fallback for connecting to another communication network.

Although both the transmitting electronic device 610 and the receiving electronic device 620 perform evolved packet system fallback, the times required for the devices to perform evolved packet system fallback may be different. For example, when the network operator to which each electronic device belongs supports the N26 interface, the time required to perform evolved packet system fallback may be shorter compared with a case where the N26 interface is not supported. The N26 interface may, for example, be an interface that connects the mobility management entity (MME) of the LTE communication network and the access and mobility management function (AMF) of the 5G communication network. As another example, depending on the surrounding environment of each electronic device, for example, when there are many electronic devices connected to one base station or when the electronic device is far away from the base station, the time required to perform evolved packet system fallback may be increased.

At operation 655, the transmitting electronic device 610 may transmit a PRACK when evolved packet system fallback is completed. In various embodiments of the disclosure, the transmission control protocol may be used regardless of the PRACK size. While performing evolved packet system fallback, the receiving electronic device 620 may fail to receive the PRACK even if the PRACK is transmitted through the transmission control protocol.

As the transmitting electronic device 610 transmits the PRACK through the transmission control protocol other than the user datagram protocol at operation 655, the corresponding network entity, for example, the proxy call session control function (P-CSCF), can retransmit the PRACK at relatively short intervals. Hence, the receiving electronic device 620 can receive the PRACK at operation 660 when evolved packet system fallback is completed. For example, the time interval at which the proxy call session control function retransmits the PRACK may be shorter than the time interval at which the transmitting electronic device 610 retransmits the PRACK according to the user datagram protocol.

At operation 665, the receiving electronic device 620 may transmit a 200 OK using a SIP response message in reply to the PRACK.

When evolved packet system fallback is completed and before receiving the PRACK, the receiving electronic device 620 may retransmit the 183 Session Progress, which was last transmitted before performing evolved packet system fallback, using a SIP response message. The SIP response message can be transmitted through the transmission control protocol regardless of its size. The SIP response message may include information indicating that evolved packet system fallback is completed. Upon receiving the 183 Session Progress, the transmitting electronic device 610 may immediately retransmit the PRACK. Upon detecting information indicating that evolved packet system fallback is completed, the transmitting electronic device 610 may immediately retransmit the PRACK. In reply to the PRACK, the receiving electronic device 620 may transmit a 200 OK using a SIP response message.

Figure 7:
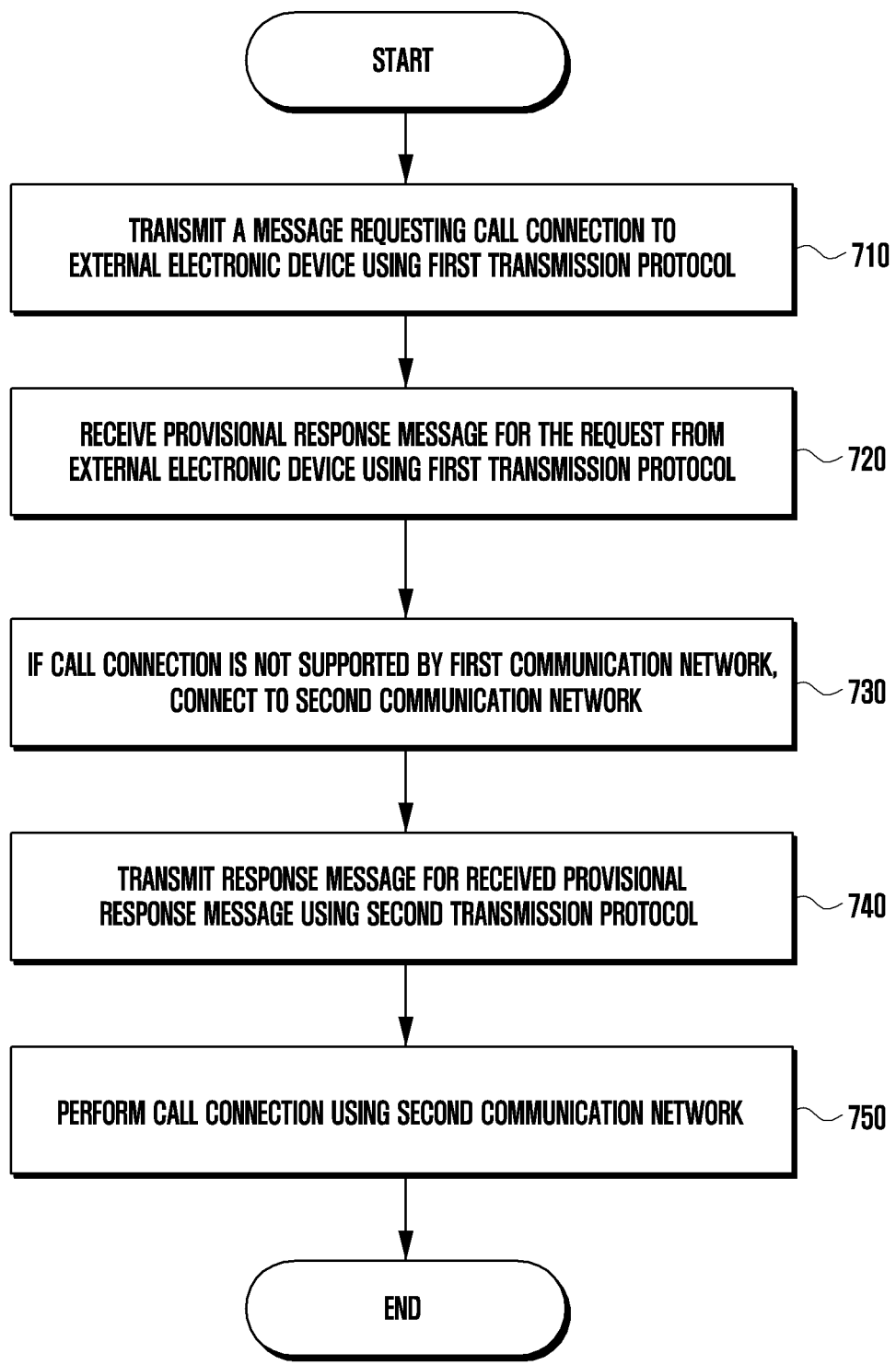
FIG. 7 is a flowchart illustrating an example operation of a transmitting electronic device performing evolved packet system (EPS) fallback according to various embodiments.

FIG. 7 is a flowchart illustrating an example operation of a transmitting electronic device performing evolved packet system (EPS) fallback according to various embodiments.

In various embodiments of the disclosure, the transmitting electronic device (e.g., transmitting electronic device 610 in FIG. 6) may be connected to a first communication network. For example, the first communication network may be a 5G network.

At operation 710, the transmitting electronic device 610 may transmit a message requesting a call connection to an external electronic device (e.g., receiving electronic device 620 in FIG. 6) using a first transmission protocol.

In various embodiments of disclosure, the message requesting a call connection may be transmitted as a SIP message with Invite. The message requesting a call connection may be transmitted using the first transmission protocol, for example, the user datagram protocol.

In operation 720, the transmitting electronic device 610 may receive a provisional response message, in reply to the message requesting a call connection, from the external electronic device 620 using the first transmission protocol. The provisional response message may be, for example, a SIP response message with 183 Session Progress.

At operation 730, the transmitting electronic device 610 may determine whether the call connection can be supported by the first communication network. If the first communication network cannot support the call connection, the transmitting electronic device 610 may switch the connection to a second communication network. While the transmitting electronic device 610 switches the connection to the second communication network, it may be unable to transmit or receive a message.

In various embodiments of the disclosure, the second communication network may be an evolved packet system (EPS) network. When the transmitting electronic device 610 switches the connection from the first communication network to the second communication network, this may be referred to as evolved packet system fallback.

At operation 740, the transmitting electronic device 610 may transmit a response message in reply to the received provisional response message using a second transmission protocol.

In various embodiments of the disclosure, the response message for the received provisional response message may be a SIP request message with a PRACK. The response message for the provisional response message may include information indicating that the transmitting electronic device 610 has completed communication network switching (or, evolved packet system fallback). For example, the information indicating completion of communication network switching may be included in the header (e.g., warning header) of the SIP request message.

At operation 750, the transmitting electronic device 610 may perform the call connection with the receiving electronic device 620 using the second communication network.

Figure 8:
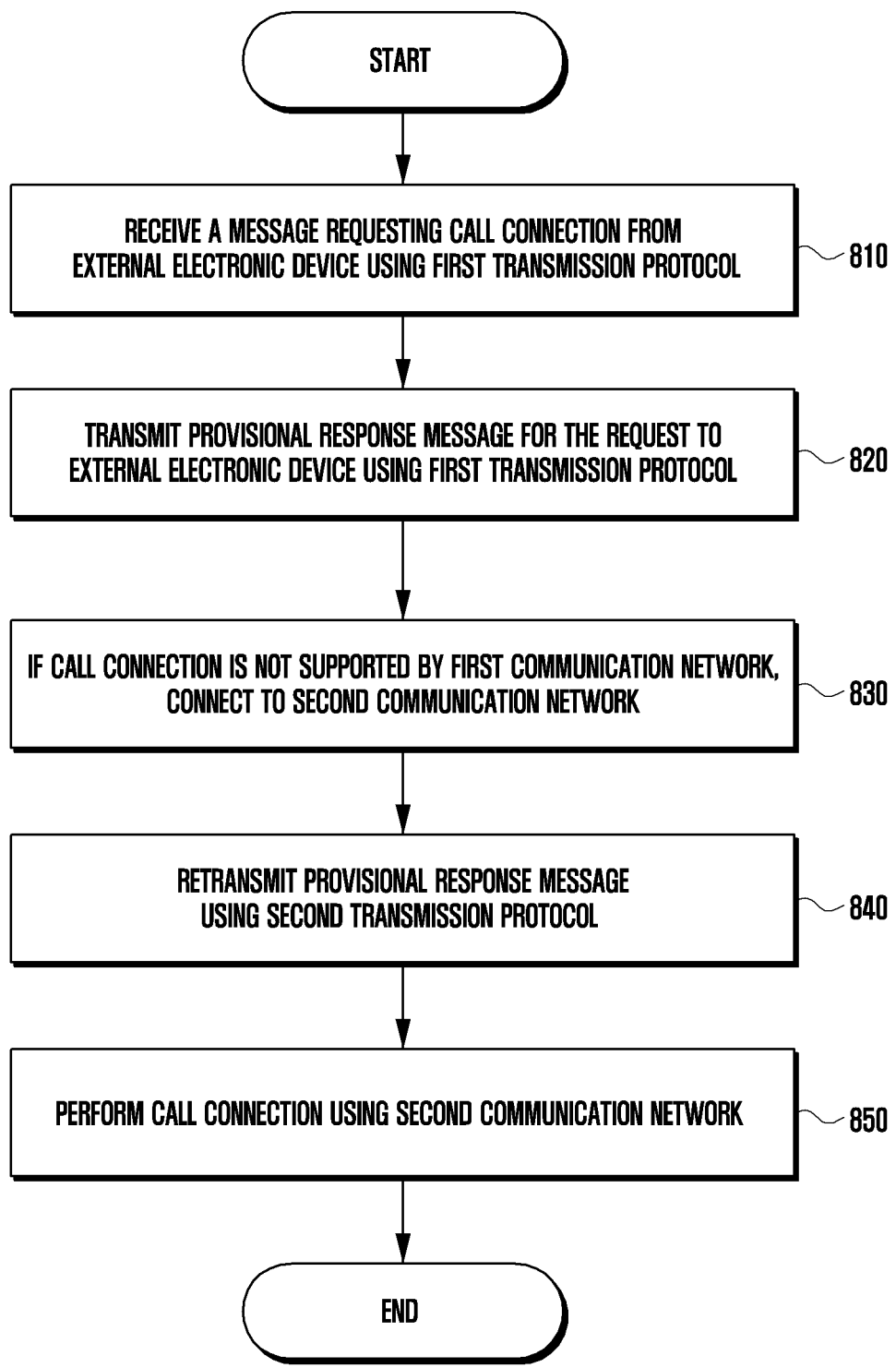
FIG. 8 is a flowchart illustrating an example operation of a receiving electronic device performing evolved packet system (EPS) fallback according to various embodiments.

FIG. 8 is a flowchart illustrating an example of a receiving electronic device performing evolved packet system (EPS) fallback according to various embodiments.

In various embodiments of the disclosure, the receiving electronic device (e.g., receiving electronic device 620 in FIG. 6) may be connected to a first communication network. For example, the first communication network may be a 5G network.

At operation 810, the receiving electronic device 620 may receive a message requesting a call connection from an external electronic device (e.g., transmitting electronic device 610 in FIG. 6) using a first transmission protocol.

In various embodiments of the disclosure, the message requesting a call connection may be transmitted as a SIP message with Invite. The message requesting a call connection may be transmitted using the first transmission protocol, for example, the user datagram protocol.

At operation 820, the receiving electronic device 620 may transmit a provisional response message, in reply to the message requesting a call connection, to the external electronic device 610 using the first transmission protocol. The provisional response message may be, for example, a SIP response message with 183 Session Progress.

At operation 830, the receiving electronic device 620 may determine whether the call connection can be supported by the first communication network. If the first communication network cannot support the call connection, the receiving electronic device 620 may switch the connection to a second communication network. While the receiving electronic device 620 switches to the second communication network, it may fail to transmit or receive a message.

In various embodiments of the disclosure, the second communication network may be an evolved packet system network. When the receiving electronic device 620 switches from the first communication network to the second communication network, this may also be referred to as evolved packet system fallback.

At operation 840, the receiving electronic device 620 may retransmit the provisional response message previously transmitted using a second transmission protocol.

In various embodiments of the disclosure, the retransmitted provisional response message may include information indicating that the receiving electronic device 620 has completed communication network switching. For example, the information indicating completion of communication network switching may be included in the header (e.g., warning header) of the SIP response message.

At operation 850, the receiving electronic device 620 may perform a call connection with the transmitting electronic device 610 using the second communication network.

According to various example embodiments of the disclosure, an electronic device connected to a first communication network may include: a communication module comprising communication circuitry; a processor operatively connected to the communication module; and a memory operatively connected to the processor, wherein the memory may store instructions that, when executed, cause the processor to control the electronic device to: transmit a message requesting a call connection through a first transmission protocol to an external electronic device using the communication module; receive a provisional response message for the request through the first transmission protocol from the external electronic device using the communication module; connect, based on the call connection not being supported by the first communication network, to a second communication network using the communication module; transmit a response message for the received provisional response message through a second transmission protocol to the external electronic device using the communication module; and perform the call connection using the connected second communication network.

According to various example embodiments of the disclosure, the response message of the electronic device may further include information indicating that the electronic device has completed communication network switching.

According to various example embodiments of the disclosure, the first transmission protocol of the electronic device may be the user datagram protocol (UDP), and the second transmission protocol may be the transmission control protocol (TCP).

According to various example embodiments of the disclosure, the second transmission protocol of the electronic device may be used to transmit the response message regardless of the size for the response message.

According to various example embodiments of the disclosure, the first communication network of the electronic device may be a fifth generation (5G) network, and the second communication network may be an evolved packet system (EPS) network.

According to various example embodiments of the disclosure, an electronic device connected to a first communication network may include: a communication module comprising communication circuitry; a processor operatively connected to the communication module; and a memory operatively connected to the processor, wherein the memory may store instructions that, when executed, cause the processor to control the electronic device to: receive a message requesting a call connection through a first transmission protocol from an external electronic device using the communication module; transmit a provisional response message for the request through the first transmission protocol to the external electronic device using the communication module; connect, based on the call connection not being supported by the first communication network, to a second communication network using the communication module; retransmit the provisional response message through a second transmission protocol to the external electronic device using the communication module; and perform the call connection using the connected second communication network.

According to various example embodiments of the disclosure, the provisional response message of the electronic device may further include information indicating that the electronic device has completed communication network switching.

According to various example embodiments of the disclosure, the first transmission protocol of the electronic device may be the user datagram protocol (UDP), and the second transmission protocol may be the transmission control protocol (TCP).

According to various example embodiments of the disclosure, the provisional response message may be transmitted to the external electronic device using the second transmission protocol of the electronic device regardless of the size of the provisional response message.

According to various example embodiments of the disclosure, the first communication network of the electronic device may be a fifth generation (5G) network, and the second communication network may be an evolved packet system (EPS) network.

According to various example embodiments of the disclosure, an operation method of an electronic device connected to a first communication network may include: transmitting a message requesting a call connection to an external electronic device using a first transmission protocol; receiving a provisional response message for the request from the external electronic device using the first transmission protocol; connecting, based on the call connection not being supported by the first communication network, to a second communication network; transmitting a message for the received provisional response message to the external electronic device using a second transmission protocol; and performing the call connection using the connected second communication network.

According to various example embodiments of the disclosure, in the operation method of the electronic device, the response message to be transmitted using the second transmission protocol may further include information indicating that the electronic device has completed communication network switching.

According to various example embodiments of the disclosure, in the operation method of the electronic device, the first transmission protocol may be the user datagram protocol (UDP), and the second transmission protocol may be the transmission control protocol (TCP).

According to various example embodiments of the disclosure, in the operation method of the electronic device, the second transmission protocol may be used to transmit the response message regardless of the size for the response message.

According to various example embodiments of the disclosure, in the operation method of the electronic device, the first communication network may be a fifth generation (5G) network, and the second communication network may be an evolved packet system (EPS) network.

According to various example embodiments of the disclosure, an operation method of an electronic device connected to a first communication network may include: receiving a message requesting a call connection from an external electronic device using a first transmission protocol; transmitting a provisional response message for the request to the external electronic device using the first transmission protocol; connecting, based on the call connection not being supported by the first communication network, to a second communication network; retransmitting the provisional response message to the external electronic device using a second transmission protocol; and performing the call connection using the connected second communication network.

According to various example embodiments of the disclosure, in the operation method of the electronic device, the provisional response message to be retransmitted using the second transmission protocol may further include information indicating that the electronic device has completed communication network switching.

According to various example embodiments of the disclosure, in the operation method of the electronic device, the first transmission protocol may be the user datagram protocol (UDP), and the second transmission protocol may be the transmission control protocol (TCP).

According to various example embodiments of the disclosure, in the operation method of the electronic device, the provisional response message may be transmitted to the external electronic device using the second transmission protocol regardless of the size of the provisional response message.

According to various example embodiments of the disclosure, in the operation method of the electronic device, the first communication network may be a fifth generation (5G) network, and the second communication network may be an evolved packet system (EPS) network.

In addition, various embodiments are possible.

It should be appreciated that various example embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been illustrated and described with reference to various example embodiments, it will be understood that the various example embodiments are intended to be illustrative, not limiting. It will be further understood by one of ordinary skill in the art that various changes in form and detail may be made without departing from the true spirit and full scope of the disclosure, including the appended claims and their equivalents.

What is claimed is:

1. An electronic device connected to a first communication network, comprising:
   a communication module comprising communication circuitry;
   a processor operatively connected to the communication module; and
   a memory operatively connected to the processor,
   wherein the memory stores instructions that, when executed, cause the processor to control the electronic device to:
   transmit a message requesting a call connection through a first transmission protocol to an external electronic device using the communication module connected to a first communication network;
   receive a provisional response message for the request through the first transmission protocol from the external electronic device using the communication module connected to the first communication network;
   after receiving the provisional response message, switching connection of the communication module from the first communication network to a second communication network based on the call connection not being supported by the first communication network;
   transmit a response message for the received provisional response message through a second transmission protocol to the external electronic device using the communication module connected to the second communication network, wherein the response message includes information indicating that the switching to the second communication network using the communication module has completed; and
   perform the call connection using the communication module connected to the second communication network.

2. The electronic device of claim 1, wherein the first transmission protocol includes a user datagram protocol (UDP), the second transmission protocol includes a transmission control protocol (TCP), the first communication network includes a fifth generation (5G) network, and the second communication network includes an evolved packet system (EPS) network.

3. The electronic device of claim 1, wherein the first transmission protocol includes a user datagram protocol (UDP), and the second transmission protocol includes a transmission control protocol (TCP).

4. The electronic device of claim 3, wherein the second transmission protocol is used to transmit the response message regardless of a size for the response message.

5. The electronic device of claim 1, wherein the first communication network includes a fifth generation (5G) network, and the second communication network includes an evolved packet system (EPS) network.

6. A method of operating an electronic device connected to a first communication network, the method comprising:
   transmitting a message requesting a call connection to an external electronic device using a first transmission protocol over the first communication network;
   receiving a provisional response message for the request from the external electronic device using the first transmission protocol over the first communication network;
   after receiving the provisional response message, switching the connection of the electronic device from the first communication network to a second communication network based on the call connection not being supported by the first communication network;
   transmitting a response message for the received provisional response message to the external electronic device using a second transmission protocol over the second communication network, wherein the response message includes information indicating that the switching to the second communication network has completed; and
   performing the call connection using the connected second communication network.

7. The method of claim 6, wherein the first transmission protocol includes a user datagram protocol (UDP), the second transmission protocol includes a transmission control protocol (TCP), the first communication network includes a fifth generation (5G) network, and the second communication network includes an evolved packet system (EPS) network.

8. The method of claim 6, wherein the first transmission protocol includes a user datagram protocol (UDP), and the second transmission protocol includes a transmission control protocol (TCP).

9. The method of claim 8, wherein the second transmission protocol is used to transmit the response message regardless of a size for the response message.

10. The method of claim 6, wherein the first communication network includes a fifth generation (5G) network, and the second communication network includes an evolved packet system (EPS) network.

* * * * *